May 12, 1959 J. A. BRIGGS 2,885,832
ART OF FORMING SURFACES OF PECULIAR CONTOURS
Filed July 20, 1956 2 Sheets-Sheet 1

INVENTOR.
JOSEPH A. BRIGGS
BY
Roderick Malcolm
ATTORNEY

May 12, 1959  J. A. BRIGGS  2,885,832
ART OF FORMING SURFACES OF PECULIAR CONTOURS
Filed July 20, 1956  2 Sheets-Sheet 2
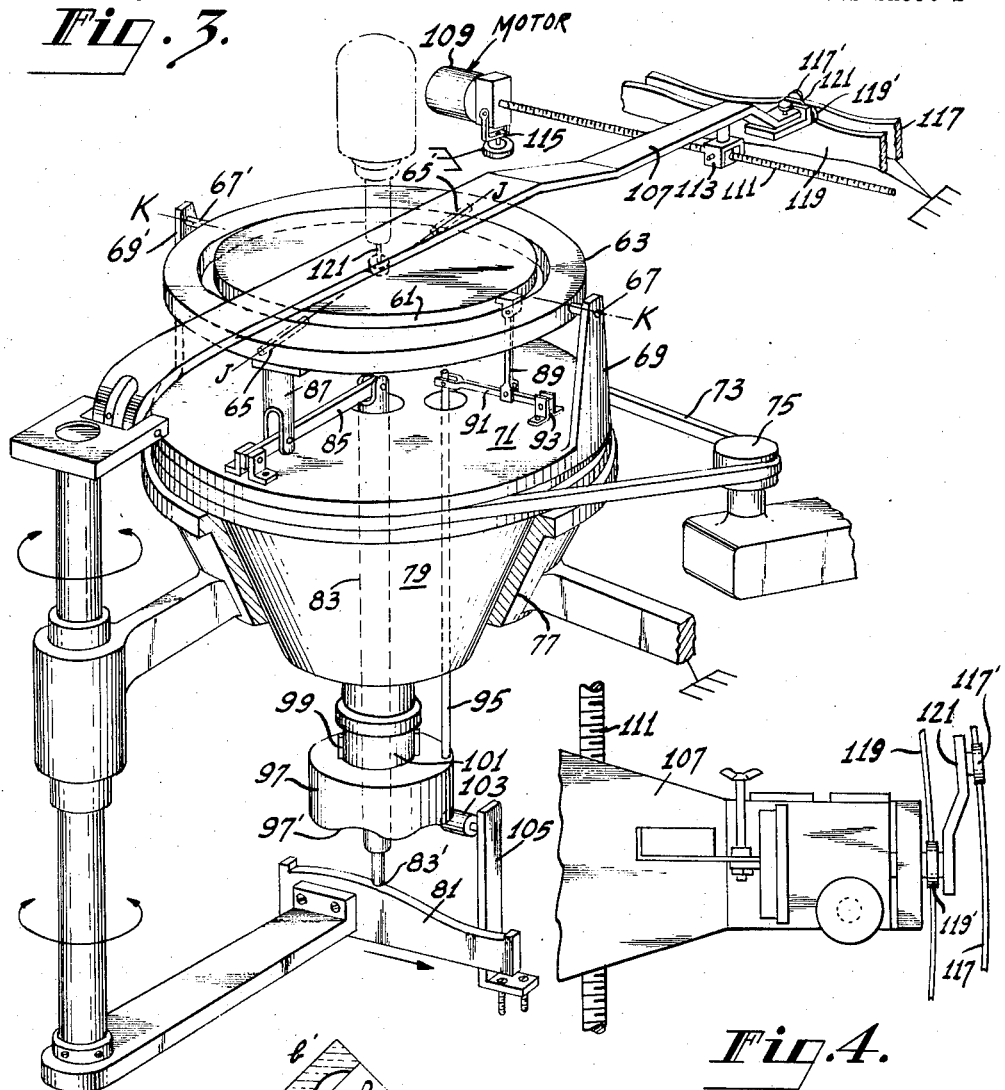
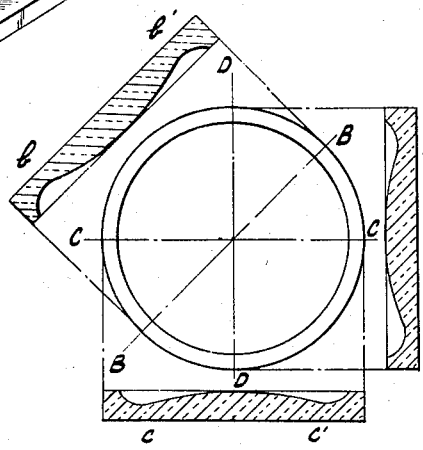
INVENTOR.
JOSEPH A. BRIGGS
BY
Roderick Malcolm
ATTORNEY

United States Patent Office 2,885,832
Patented May 12, 1959

2,885,832

ART OF FORMING SURFACES OF PECULIAR CONTOURS

Joseph A. Briggs, Cranbury, N.J., assignor to Radio Corporation of America, a corporation of Delaware Application July 20, 1956, Serial No. 599,123

7 Claims. (Cl. 51—124)

This invention relates to the art of forming surfaces of peculiar contours such, for example, as the surface of an optical lens of the aspheric asymmetric variety.

An aspheric asymmetric lens is one having no axis of symmetry but which may, or may not, have a line of symmetry in the plane of the lens. Such lenses find useful application in the light-box or "lighthouse" used in laying down a dot-like (or line-like) mosaic pattern constituted of color-phosphors on the screen-plate of a color-kinescope. (As to this see copending application Serial No. 585,254, filed May 16, 1956 of Epstein, Kaus and Van Ormer.) The peculiarly shaped profiles of such lenses cannot be formed by conventional lens-grinding machines and the principal object of the present invention is to provide a novel method of an apparatus for cutting, grinding, polishing or otherwise generating the above-mentioned and other peculiarly shaped surfaces.

Stated generally, the foregoing and related objects are achieved in accordance with the present invention by the provision of a lens-grinding or profiling machine having a turntable mounted to permit of continuously variable tilting movement or movements about at least one axis normal to its axis of rotation and by the provision of a carriage for a cutting-tool, or the like, mounted to permit undulatory movement substantially along a radius of the work-piece in predetermined relationship with respect to the tilting movement(s) of the turntable.

The invention is described in greater detail in connection with the accompanying two sheets of drawings, wherein:

Fig. 2 is a plan view of the top face of an optical lens having a single line of symmetry (D—D) but no axis of symmetry, and showing the peculiar profile of said top face along (I) said single line of symmetry, (II) along a line 45° removed from said line of symmetry and also (III) along a line 90° removed from said line of symmetry;

Fig. 3 is a view in perspective of a profiling machine constructed and operated in accordance with the principle of the invention to provide a workpiece or "blank" with a surface having no line of symmetry; and Fig. 4 is a plan view of an auxiliary or vernier control for the carriage or cutter arm of the profiling machine of the invention.

Figure 1:
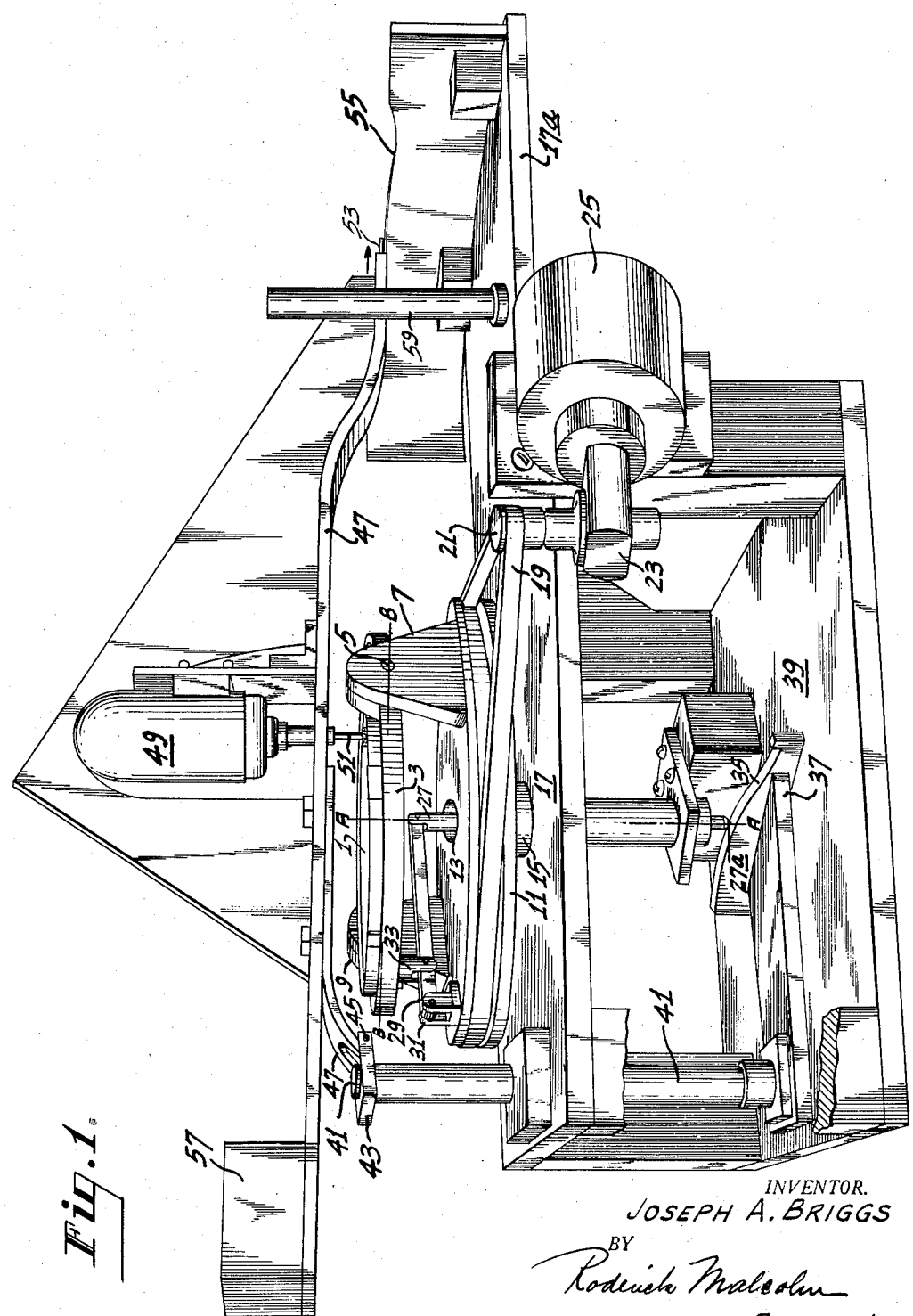
Fig. 1 is a view in perspective of a machine constructed and operated in accordance with the principle of the invention to provide a workpiece or "blank" with a surface having a profile corresponding to that of the aspheric asymmetric optical lens of Fig. 2.

In the embodiment of the invention shown in Fig. 1, 1 designates the glass, ceramic, metal, plastic or wax disc or "blank" which is to be cut, ground, or otherwise given the unusual profile shown in Fig. 2. This blank 1 is removably fixed by any suitable means to a turntable 3 which is supported for tiltable movement about an (horizontal) axis (B—B) normal to its (vertical) axis (A—A) of rotation as on pivots 5 seated in oppositely located arms 7 and 9 which are carried on a driving wheel 11 beneath the turntable. The wheel 11 for driving the turntable 3 has a central opening 13 and is supported, on its underside, for rotation in a horizontal plane, as on bearings (not shown) within a hollow hub 15 surrounding the hole 13. The housing of the hub 15 is supported against rotation, as on a platform 17. The driving wheel 11, and hence turntable 3 and the arms 7 and 9 thereon, are here shown as driven by a belt 19 which is connected through a pulley 21 and gear-box 23 to a motor 25. A vertical shaft 27 supported within the hub 15 to permit of both rotational and axial movements, extends through the hole 13 at the center of the driving wheel 11. Vertical movement of the shaft 27 controls the tilting movement of the turntable 3 about the horizontal axis B—B through a lever 29. This lever 29 has its fulcrum 31 supported on the wheel 11 and transmits its tilting force to a point on the periphery of the turntable 3 through a link 33 on the underside of the turntable. The lower end of the vertically movable shaft 27 terminates in a cam-follower 27a which bears against a movable cam 35 (later described). Hence the instantaneous angle of tilt of the turntable is determined by the instantaneous position of the cam-follower 27a on the cam 35. The cam 35 is here shown supported on the free-end of a horizontal arm 37 for arcuate movement, on the base 39, about the axis of a vertical shaft 41. A collar 43 fixed on the upper end of the vertical shaft 41 has a pin 45 extending therethrough which serves as a fulcrum for a tiltable cutter arm or carriage 47 upon which a motor 49 for a cutting, grinding or polishing tool 51 is supported above the work-piece 1 on the tiltable turntable 3. The arm or carriage 47 extends across and beyond the turntable 3 and terminates in a cam-follower 53 which bears against a stationary cam or template 55 (later described) on an extension 17a of the platform 17. Thus, the carriage 47, and hence the tool 51 thereon, is subject to undulatory movement as the cam follower 53 is moved along the surface of the stationary cam 55. A counterweight 57 may be provided on the opposite end of the carriage 47 to regulate the force applied to the tiltable work-piece or blank 1 through the tool 51.

In the instant case the force required to move the cam-follower 53 along the stationary cam 55 is applied manually to the arm or carriage 47. However the carriage 47 and hence the tool 51 and the cam-follower 53 thereon may be driven by a motor (see Fig. 3) and such motor drive may include a mechanism for returning the carriage to its starting position to repeat its excursion in the event that more than one excursion is required to remove the desired quantity of material from the work-piece 1. Assuming that the movement of the carriage 47 is in the direction of the arrow in Fig. 1, then the undulatory movement of the tool 51 in contact with the blank 1 is outwardly from the center substantially along a radius of the blank 1 toward or to its periphery. Suitable stops, exemplified by the post 59, may be provided for limiting the movement of the arm 47, and hence the movement of the cam follower 53, to the length of the cam 55. Since the carriage or cutter arm 47 is coupled (through the pin 45, collar 43, shaft 41 and arm 37) to the lower cam 35, movement of the cam follower 53 along the cam 55 produces a corresponding movement of the cam 35 with respect to the cam-follower 27a on the lower end of the vertically movable shaft 27. This latter movement controls the instantaneous angle of tilt of the turntable 3 about its horizontal axis B—B. It will thus be seen that the depth of the cut provided by the rotating tool 51 depends upon two forces, (I) the force determined by the instantaneous position of the cam-follower 53 on the cam 55 and (II) the force determined by the position, at that instant, of the cam-follower 27a on the cam 35 which controls the tilt of the turntable 3 upon which the work-piece 1 is supported. These forces may be additive or they may oppose each other, at any particular angle of rotation of the turntable, depending upon the relative rise of the cams at corresponding points along their lengths.

When, as in Fig. 1, the machine of the invention is set-up to provide the blank 1 with a curved surface similar to that of the aspheric asymmetric lens of Fig. 2, the profile of the (stationary) cam 55 is made to correspond to the curvature of said lens along either half (c or c') of a line C—C drawn at right angles to its line of symmetry D—D, and the (movable) cam 35 is given a profile (which may be either positive or negative) which at every point corresponds to the difference in the depth of the lens profiles d—d' and c—c' taken along either half of the line d or d' of Fig. 2. It need scarcely be pointed out that the exact overall length and depth or "rise" of the cams 35 and 55 depend not only on the dimensions of the lens but also upon the ratios of the lengths selected for the lever systems of the machine (e.g. levers 27, 29, 31, 33; 37, 41, 47, 51; 51–53).

The aspheric asymmetric lens of Fig. 2 has no axis of symmetry (extending through the lens) though it does have a single line of symmetry (D—D) in the "plane" of the lens. Thus, should the lens be cut in half along its line of symmetry, then the separate pieces (c, c') would be complementary, i.e. they would be mirror images of each other. A profile along the diameter C—C therefore is symmetrical, i.e. the part c' is a mirror image of the part c. A profile along D—D however, is not symmetrical, but d is deeper than c by the same amount that d' is shallower than c'. The depth of the lens taken at any point on the profile B—B (which is at 45° with the line of symmetry D—D) is intermediate between the profiles C—C and d—d'. The machine of the present invention can be adapted to the production of lens-profiles and curved surfaces without this systematic relationship between the depth and height of any two of its sections. This may be done, in accordance with the invention, by the provision of a turntable mounted to permit of tiltable movement in two directions, at right angles to each other, and by the provision of a cam mechanism for controlling the second or added direction of tilt as a function of the instantaneous position of the cutting tool on the radius of the work-piece. Such a machine is shown in perspective in Fig. 3.

In the embodiment of the invention shown in Fig. 3, the turntable, which is here designated 61, is provided with a gimbal ring 63 about which it can tilt in bearings 65, 65' on an axis J—J through a diameter of the ring, while the ring itself is so pivoted, as on bearings 67, 67', to its supporting arms 69, 69' that it can tilt about a diameter K—K at right angles to the first. As in the earlier described embodiment of the invention the force required to rotate the turntable 61 is supplied to the driving wheel 71 as through a belt 73 and a motor driven pulley 75. Here, however, the driving wheel 71, instead of being supported at its center is supported about its periphery on a large conical bearing 77 dimensioned to receive a complementary cone 79 secured to the underside of said wheel.

The force required to tilt the rotating turntable in the "second direction" (i.e. about the diameter K—K) is supplied through a cam 81, a vertically movable cam follower 83' on the lower end of vertically movable shaft 83, a lever arm 85 and a link 87, which latter part, in the instant case, is attached to the gimbal ring 63 instead of to the turntable (as it is in Fig. 1). The force required to tilt the rotating turntable in the "first direction" (i.e. about the diameter J—J) is applied to the underside of the turntable 61 at a point 90° removed from the link 87 by a link 89 secured at its lower end to a lever 91 which has its fulcrum 93 secured to the driving wheel 71 and its free-end actuated by a rod 95. This rod 95 extends downwardly through a hole in the driving wheel 71 and is secured at its lower end to an inverted cup-shape cam 97 which is supported, as on splines 99, for vertical movement on a collar 101 secured to the underside of the rotating conical extension 79 of the driving wheel, so that said cam (97) rotates in synchronism with the driving wheel 71 and turntable 61. The cam-surface 97' on the lip of the cup-shape cam 97 engages a roller 103 on a stationary arm 105. Thus, as the cam 97 rotates in synchronism with the wheel 71 and turntable 61 it moves up and down on its collar 101 as determined by the rise of the cam-surface 97' at its point of contact with the roller 103. This vertical movement of the cam 97 produces a corresponding vertical movement of the shaft 95, which latter movement operates, through the lever 91 and its coupling 89, to control the angle of tilt of the turntable 61 about the "first direction," J—J. Since this cup-shape cam 97 extends a full 360° around the axis of rotation of the turntable 61 it may be employed to produce a localized variation in the depth of the lens-blank (or other work-piece) along any arc of its circumference and at any distance from its center.

The cutter arm or carriage, here designated 107, may be driven by a motor 109 which, as here shown, transmits its driving force to the carriage through a lead-screw 111 which is releasably coupled thereto as by means of a detachable (split) nut 113 on the underside of the carriage. The motor 109 and the lead-screw 111 are supported for rotation about a vertical axis and for tiltable movement about a horizontal axis on a suitable pedestal 115 to permit them to follow the arcuate and undulating movements of the carriage 107.

Referring now to both Figs. 3 and 4: the carriage 107 may be provided with a vernier control system comprising an auxiliary cam 117, disposed adjacent to the "master" cam or template 119, and an auxiliary cam-follower 117' which adds its lift to the lift supplied to the carriage by the cam-follower 119' through a lever-arm 121. The necessity or desirability of employing such an auxiliary control mechanism can be determined, after the "master" cam 119 has been cut, by the use of a micrometer (not shown) mounted in place of the cutting tool (here designated 121) and by moving the carriage, and hence the micrometer, under control of said cam (119) across a radius of a perfectly cut model-blank (not shown) on the turntable. If the micrometer reveals any inaccuracy in the rise or fall of the carriage at any point on the radius of the model, an auxiliary cam 117 cut, at the appropriate place along its length, to compensate for such a localized inaccuracy, may be provided.

The machine of the invention is susceptible of other refinements, not here illustrated. By way of example, when the work piece is constituted of a hard material (e.g. glass, ceramic or metal) which may require the use of bort and/or a coolant during the cutting, appropriate hoses and gutters may be provided for supplying and withdrawing such materials to and from the area being cut. Similarly, it is apparent that appropriate means (e.g. a variable speed motor) may be employed for regulating the speed of the turntable and the rate of movement of the cutting arm or carriage across the turntable.

From the foregoing description it should now be apparent that the present invention provides a new and useful method of, and apparatus for, cutting, grinding, polishing or otherwise generating aspheric asymmetric and other peculiarly-shaped surfaces.

What is claimed is:

1. Method of providing a work-piece with an aspheric asymmetric surface which comprises rotating said work-piece in contact with a tool adapted to penetrate a surface of said work-piece and to remove material therefrom, moving said tool along substantially a radius of said surface while subjecting said tool to undulatory movement to alter the depth of the tool's penetration of said surface, and simultaneously tilting said rotating work-piece about an axis normal to its axis of rotation further to alter the depth of the tool's penetration of said surface.

2. Method of providing a work-piece with a curved surface having neither an axis of symmetry nor a line of symmetry, said method comprising rotating said work-piece in contact with a tool adapted to penetrate a surface of said work-piece and to remove material therefrom, moving said tool along substantially a radius of said surface while subjecting said tool to undulatory movement to vary the depth of the tool's penetration of said surface, and simultaneously tilting said rotating work-piece about a first axis normal to its axis of rotation and about an axis at right angles to said first axis whereby further to vary the depth of the tool's penetration of said surface.

3. A profiling machine comprising a turntable adapted to support a work-piece and supported for rotation and for tiltable movement about an axis normal to its axis of rotation, a tool for removing material from a surface of said work-piece, a carriage upon which said tool is supported for undulatory movement in contact with said surface, means including said carriage for moving said tool along substantially a radius of said surface of said work-piece, and means responsive to said movement for altering the angle of tilt of said turntable and for subjecting said tool to undulatory movement.

4. A profiling machine comprising a turntable adapted to support a work-piece and supported for rotation and for tiltable movement about an axis normal to its axis of rotation, a tool for removing material from a surface of said work-piece, a carriage upon which said tool is supported for undulatory movement in contact with said surface, means including said carriage for moving said tool along substantially a radius of said surface of said work-piece and for simultaneously subjecting said tool to said undulatory movement, and means responsive to the instantaneous position of said carriage, and hence the instantaneous position of said tool along said radius, for controlling the undulatory movement of said tool and the angle of tilt of said turntable.

5. A profiling machine comprising a turntable adapted to support a work-piece and supported for rotation and for tiltable movement about a first axis normal to its axis of rotation and about a second axis at right angles to said first axis, a tool adapted to penetrate a surface of said work-piece and to remove material therefrom, a carriage upon which said tool is supported in contact with said work-piece, said carriage being mounted to permit of undulatory movement and lateral movement with respect to a plane normal to its axis of rotation, means for rotating said turntable, means including said carriage for moving said tool along substantially a radius of said work-piece, means including said carriage for simultaneously subjecting said tool to an undulatory movement to alter the depth of the tool's penetration of said surface, and means for tilting said rotating turntable and hence said work-piece simultaneously about said first and said second axis further to control the depth of the tool's penetration of said surface.

6. Method of making a lens of the kind having a single line of symmetry in the plane of the lens but containing no axis of symmetry normal to said plane, said method comprising; subjecting a blank from which said lens is to be formed to rotation in contact with a tool adapted to penetrate and to remove material from said blank; moving said tool radially with respect to said blank while subjecting said tool to an undulatory movement corresponding to the contour of said lens as measured through the center of the lens at a right angle to its said single line of symmetry, whereby to endow said blank with a corresponding line of symmetry; tilting said rotating blank about its axis of rotation to vary the depth of the tool's penetration of said blank along its said line of symmetry; and varying the direction and the degree of said tilting movement as dictated by the contour of said lens at points corresponding to the instantaneous position of said tool on said rotating blank.

7. A profiling machine for providing a work-piece with an aspheric asymmetric surface of the kind having a single line of symmetry in the plane of said surface and no axis of symmetry normal to said plane, said machine comprising; a turntable adapted to support said work-piece, means supporting said turntable for rotation and for tiltable movement about an axis normal to its axis of rotation, a tool for removing material from a surface of said work-piece, a carriage upon which said tool is supported for undulatory movement in contact with said surface, means including said carriage for moving said tool radially with respect to said work-piece, cam means including a stationary cam having a profile corresponding to the curvature of said aspheric asymmetric surface as measured through the center thereof at a right angle to its said single line of symmetry and a cam follower mounted on said carriage in a position to engage and to follow said cam surface whereby upon said radial movement of said carriage said tool is subjected to undulatory movement corresponding to the contour of said surface as measured through the center thereof at a right angle to its said single line of symmetry, second cam means including a cam follower coupled to said turntable to control the instantaneous angle of tilt thereof and a cam supported in contact with said cam follower for radial movement corresponding to the radial movement of said carriage and tool, said cam having a profile determined by the difference in depth of said aspheric asymmetric surface at equal distances from the center of said surface along said line of symmetry and the line at right angles thereto.

References Cited in the file of this patent

UNITED STATES PATENTS

| | | |
|---|---|---|
| 1,171,174 | Corry | Feb. 8, 1916 |
| 2,392,478 | Holman | Jan. 8, 1946 |